United States Patent
Iwase

(10) Patent No.: US 8,659,778 B2
(45) Date of Patent: Feb. 25, 2014

(54) IMAGE FORMING APPARATUS OPERABLE IN FIRST AND SECOND MODES FOR PROCESSING JOB DATA, AND JOB DATA STORING METHOD

(75) Inventor: Tomohiro Iwase, Fuchu (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 20 days.

(21) Appl. No.: 13/359,599

(22) Filed: Jan. 27, 2012

(65) Prior Publication Data

US 2012/0200884 A1 Aug. 9, 2012

(30) Foreign Application Priority Data

Feb. 8, 2011 (JP) ................................. 2011-024706

(51) Int. Cl.
*G06F 3/12* (2006.01)
(52) U.S. Cl.
USPC .......... 358/1.15; 358/1.1; 358/1.18; 711/114; 711/157; 711/161; 714/13
(58) Field of Classification Search
USPC ......... 358/1.15, 1.1, 1.18; 711/114, 157, 161; 714/13
See application file for complete search history.

(56) References Cited

U.S. PATENT DOCUMENTS

| 2010/0169573 A1* | 7/2010 | Tsuji ............................. 711/114 |
| 2010/0180076 A1* | 7/2010 | Sundrani ....................... 711/114 |

FOREIGN PATENT DOCUMENTS

JP 2010-097364 A 4/2010

OTHER PUBLICATIONS

Takaguchi Masatsugu, Storage Device and Storage-Controlling Method, Sep. 9, 2010, JP 2010198424 A.*

* cited by examiner

*Primary Examiner* — Benny Q Tieu
*Assistant Examiner* — Martin Mushambo
(74) *Attorney, Agent, or Firm* — Holtz, Holtz, Goodman & Chick

(57) ABSTRACT

An image forming apparatus including: a storage device composed of a plurality of storage sections for storing a job data to be input; an image forming section for performing an image formation based on the job data having been stored in the storage device; and a control section configured to control a first mode for processing an independent job data, and a second mode for processing a plurality of job data in parallel, wherein the control section is configured to control in such a manner that a storage section, in said plurality of storage sections, to be used in the first mode differs from a storage section to be used in the second mode.

2 Claims, 7 Drawing Sheets

IMAGE FORMING APPARATUS OPERABLE IN FIRST AND SECOND MODES FOR PROCESSING JOB DATA, AND JOB DATA STORING METHOD

This application is based on Japanese Patent Application No. 2011-024706 filed on Feb. 8, 2011 with the Japan Patent Office, the entire content of which is hereby incorporated by reference.

TECHNICAL FIELD

The present invention relates to an image forming method and an image forming apparatus in a state in which a storage device for storing job data with respect to image formation is provided.

BACKGROUND OF THE INVENTION

In a case of a MFP (Multi-Function Peripheral) as a single apparatus which is provided with functions such as a scanner, a printer, a copying machine, and a facsimile, it is necessary to memorize various types of data, such as scan data which is obtained by scanning, print data (print data before RIP (Raster Image Processor)) which is transmitted from an external device or image data as rasterized bit map data (print data after RIP), on a job basis.

Therefore, hard disks (HDD: Hard Disk Drive) have been installed in image forming apparatuses as a non-volatile storing device for storing large volumes of image data.

It should be noted that, since a plurality of functions exists in such an image forming system, there are the cases in which two accesses or more to an identical storage device conflict with each other. For such a conflicting state, a technique has been disclosed in Unexamined Japanese Patent Application Publication No. 2010-097364 (hereinafter, referred to as Patent Document 1) in which access to a file with a lower priority is executed in parallel while giving a higher priority to access to a file with a higher priority.

In the technique of parallel execution of conflicting access, disclosed in the above-mentioned Patent Document 1, there exists a problem in that sufficient performance cannot be achieved in a case of file access with a lower priority.

It should be noted that, in the case of an image forming system in which an image forming apparatus which consists of a control section and a HDD, and a controller which consists of a control section and a HDD, are used cooperatively, the control sections and the HDDs may be combined to form an image forming apparatus by unifying the image forming apparatus and the controller.

In this case, in a case in which scan data, which has been scanned by a scanner, is stored in the HDD at the time of accessing to the HDD to pea form image expansion of print data from an external PC, access to the HDD may conflict in the unified image forming apparatus, when compared with conventional cases in which each of the HDD in the controller and in the image forming apparatus can be accessed.

Consequently, although the technique disclosed in the above-described Patent Document 1 may be applied, the performance may be degraded in either processing. Therefore, as a result of a delay in the processing due to the degradation of performance, influence of the delay may affect the entire subsequent processing.

SUMMARY OF THE INVENTION

The present invention has been achieved in consideration of the above problems, and it is one of the main objects to realize an image forming method and an image forming apparatus in which, even in a case wherein accesses of a plurality of processings to a storage device conflict with each other, performance in either processing will not be degraded.

That is, the present invention has been achieved to solve the problem described above, and is structured as follows:

[1] An image forming apparatus reflecting one aspect of the present invention includes, but is not limited to: a storage device composed of a plurality of storage sections for storing a job data to be input; an image forming section for performing an image formation based on the job data having been stored in the storage device; and a control section configured to control a first mode for processing an independent job data, and a second mode for processing a plurality of job data in parallel, wherein the control section is configured to control in such a manner that a storage section, in said plurality of storage sections, to be used in the first mode differs from a storage section to be used in the second mode.

[2] The image forming apparatus described in [1], reflecting another aspect of the present invention, wherein all of the plurality of said storage sections is used by striping with respect to an independent job data in the first mode, and a different storage section in said storage sections is used for each of a plurality of job data in the second mode.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

Hereinafter, preferred embodiments of the present invention will be described in detail with reference to the accompanying drawings, without the present invention being limited to the embodiments.

[Structure of Image Forming Apparatus]

Figure 1:
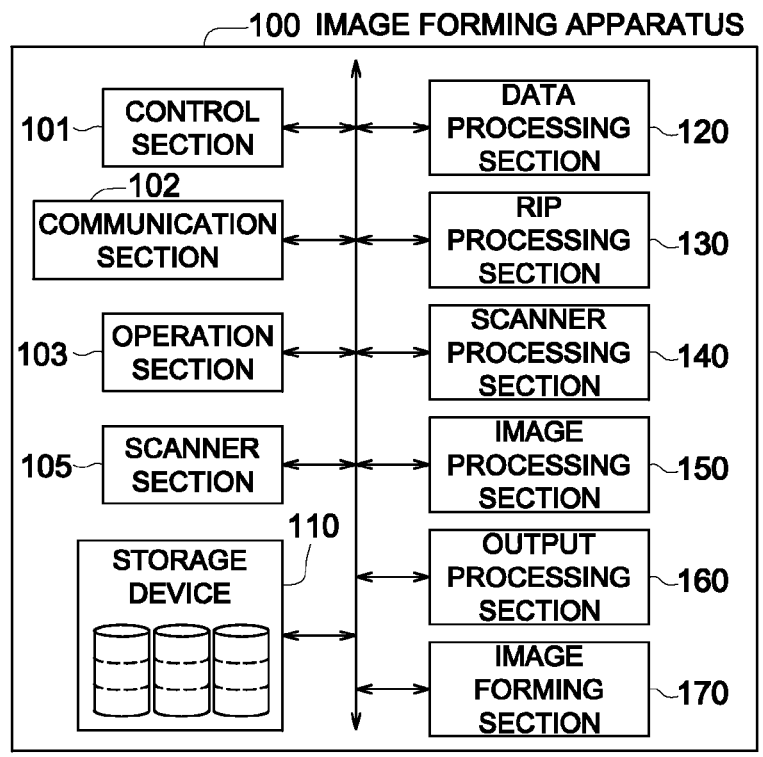
FIG. 1 is a block diagram schematically illustrating a structure of an image forming apparatus according to a preferred embodiment of the present invention.

Image forming apparatus 100, illustrated in FIG. 1, is composed of: a) control section 101, composed of a CPU (Central Processing Unit), and the like, which controls each of the sections included in image forming apparatus 100; b) communication section 102 for communicating with other apparatuses via various type of networks; c) operation section 103 which is composed of a liquid crystal display section and a touch-panel, and into which an operation from the user is input; d) scanner section 105 that reads out an original document optically via a light source and a reading element; e) storage device 110 that memorizes various types of data, handled in image forming apparatus 100, into hard disk drive (HDD) which is a non-volatile storage means; f) data processing section 120 that carries out processing for storing print data before RIP (Raster Image Processor), having been received from an external device, into storage device 110; g) RIP processing section 130 that generates print data after RIP, which is in a bit-map format, by rasterizing print data before RIP, which is described in a page description language; h) scanner processing section 140 that generates scan data by executing various types of processings with respect to the result of read-out via scanner section 105; i) image processing section 150 that carries out compression processing to print data after RIP and scan data, which are to be stored in storage device 110, and reads out print data after RIP and scan data, having been compressed and stored in storage device 110, and carries out decompression processing to those data; j) output processing section 160 that carries out various types of processings to print data after RIP with respect to image forming and output operations; and k) image forming section 170 that executes image forming and output operations, as a print engine, via an electro-photographic method.

Figure 2:
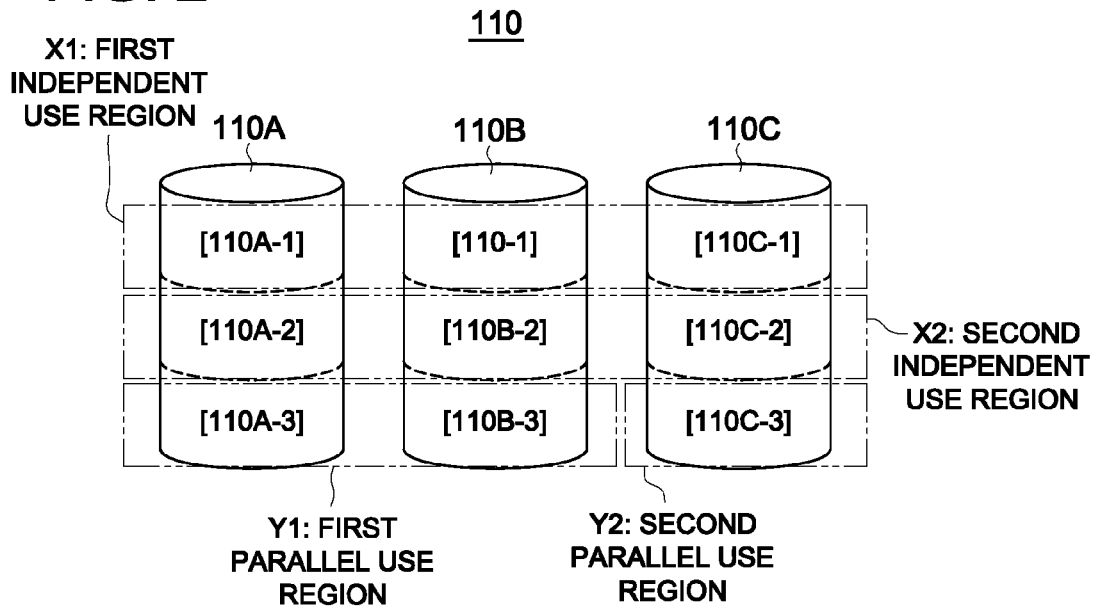
FIG. 2 is a block diagram schematically illustrating a structure of a storage device.

FIG. 2 is a block diagram schematically illustrating a structure of storage device. 110 according to this preferred embodiment. Here, storage device 110 consists of; but is not limited to, three hard disk drives (HDDs), HDD 110A, HDD 110B, and HDD 110C. It should be noted that the "a plurality of storage sections", referred to in the above-mentioned structure [1], referrers to these plural HDDs, and a minimum of two HDDs may be required to perform well.

Also, the storage region of storage device 110, which includes these plural storage sections, consists of, as illustrated in FIG. 2, first independent use region X1 where parallel use of other use regions is not allowed since all of HDD 110A-HDD 110C are simultaneously used by striping, and second independent use region X2 where parallel use of other use regions is not allowed as all of HDD 110A-HDD 110C are simultaneously used by striping. Here, the term "striping" refers to a method in which a single data is written into a plurality of hard disks simultaneously by distributing the data to the hard disks to increase the speed of storage and read-out of data.

Additionally, the storage region of storage device 110 consists of first parallel use region Y1 where HDD 110A-HDD 110B are used so that parallel use with HDD 110C is allowed, and second parallel use region Y2 where HDD 110C is used so that parallel use with HDD 110A-HDD 110B is allowed.

In other words, storage device 110 is structured so as to consist of the above-mentioned four storage regions in total. It should be noted that this FIG. 2 is an example, and storage device 110, which consists of a plurality of storage sections, may consist of at least one independent use region X and at least two parallel use regions Y.

Here, HDD 110A consists of storage region 110A-1 which consists of a part of the storage region of first independent use region X1, storage region 110A-2 which consists of a part of the storage region of second independent use region X2, and storage region 110A-3 which consists of a part of the storage region of first parallel use region Y1. Similarly, HDD 110B consists of storage region 110B-1 which consists of a part of the storage region of first independent use region X1, storage region 110B-2 which consists of a part of the storage region of second independent use region X2, and storage region 110B-3 which consists of a part of the storage region of first parallel use region Y1. Also, HDD 110C consists of storage region 110C-1 which consists of a part of the storage region of first independent use region X1, storage region 110C-2 which consists of a part of the storage region of second independent use region X2, and storage region 110C-3 which consists of a part of the storage region of second parallel use region Y2.

This storage device 110 can be operated via control of control section 101, under a first mode in which independent job data is processed, and a second mode in which a plurality of job data is processed in parallel. By using first independent use region X1 or second independent use region X2 in the first mode, and by using first parallel use region Y1 or second parallel use region Y2 in the second mode, it is controlled in such a manner that a storage section, in the plurality of storage sections, to be used in the first mode differs from a storage section to be used in the second mode.

Also, the first mode is a mode in which all of the plural storage sections are used by striping with respect to independent job data, and the second mode is a mode in which a different storage section in said storage sections is used for each of the plural job data, and the first mode is used in cases in which accesses to the storage device, via the processing of job data, do not conflict with each other, and second mode is used in cases in which accesses to the storage device, via the processing of job data, conflict with each other.

It should be noted that "job" herein refers to a series of operations with respect to an image forming apparatus, such as scanning, copying, printing, and the like, and for example, in a case of copying of a plurality of original documents, the series of operations with respect to copying operations of a plurality of original documents on a plurality of paper sheets is one job. Also, in this preferred embodiment, "job data" refers to print data before RIP, print data after RIP, and scan data.

Also, in this preferred embodiment, either one of first independent use region X1 or second independent use region X2 is assigned as an FS (file system) region, and the other is assigned as a RAW region. In a similar manner, in this preferred embodiment, either first parallel use region Y1 or second parallel use region Y2 is assigned as an FS (file system) region, and the other is assigned as a RAW region.

Here, FS region refers to a region which is managed by a file system of an operating system, and a region for storing image data, having been designated by the user via operation section 13, so as to be reusable via searching afterwards in terms of a file name or various types of attributes. Although the writing and reading speed of the data is not so important, various types of managements and usages of data via the file system are possible.

Meanwhile, RAW region is a region which is managed as a RAW device by control section 101, and is a region, as a virtual storage for supplementing the insufficient capacity of the volatile memory, for temporarily storing image data into image forming section 170 to output the image data at a prescribed timing. Because the RAW region requires speed for data writing and reading, the data management is carried out directly by control section 101, and image data of one page is written in continuous clusters by the management of a start cluster number and an end cluster number.

[Operations of Image Forming Apparatus (Comparison Example)]

Here, operations of a comparison example which is to be compared with operations of an image forming apparatus according to the preferred embodiment will be initially described. It should be noted that, in the explanations below, explanations of transmission and reception of general data as an image forming apparatus are omitted, and storage and read-out of print data and scan data, which constitute the features of this preferred embodiment, will be described.

Figure 3:
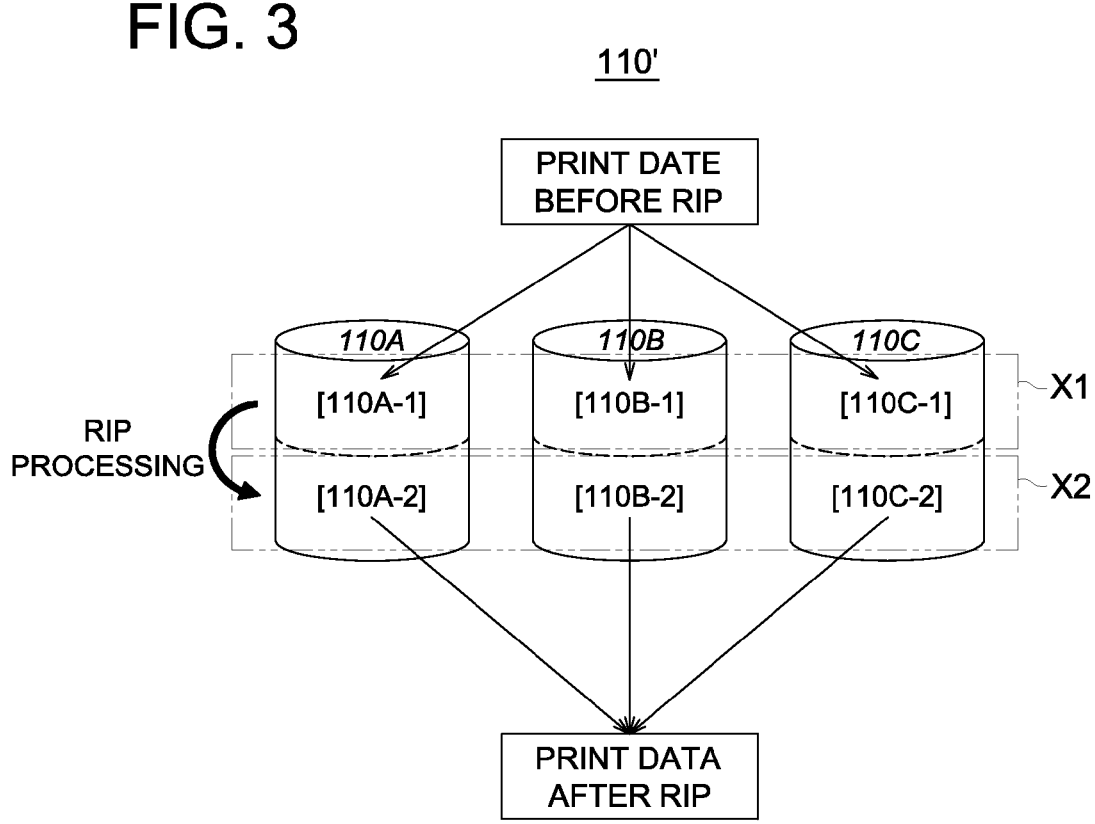
FIG. 3 is a block diagram schematically illustrating another structure of a storage device.

Herein, as a concrete example, storage device 110', which consists of a plurality of storage sections 110A, 110B and 110C, will be described. Here, as illustrated in FIG. 3, the storage region of storage device 110' consists of first independent use region X1 where parallel use of other use regions is not allowed as all of HDD 110A-HDD 110C are simultaneously used by striping, and second independent use region X2 where parallel use of other use regions is not allowed as all of HDD 110A-HDD 110C are simultaneously used by striping. However, in this storage device 110', first parallel use region Y1 and second parallel use region Y2, which can be used in parallel and exists in FIG. 2, do not exist.

Figure 4:
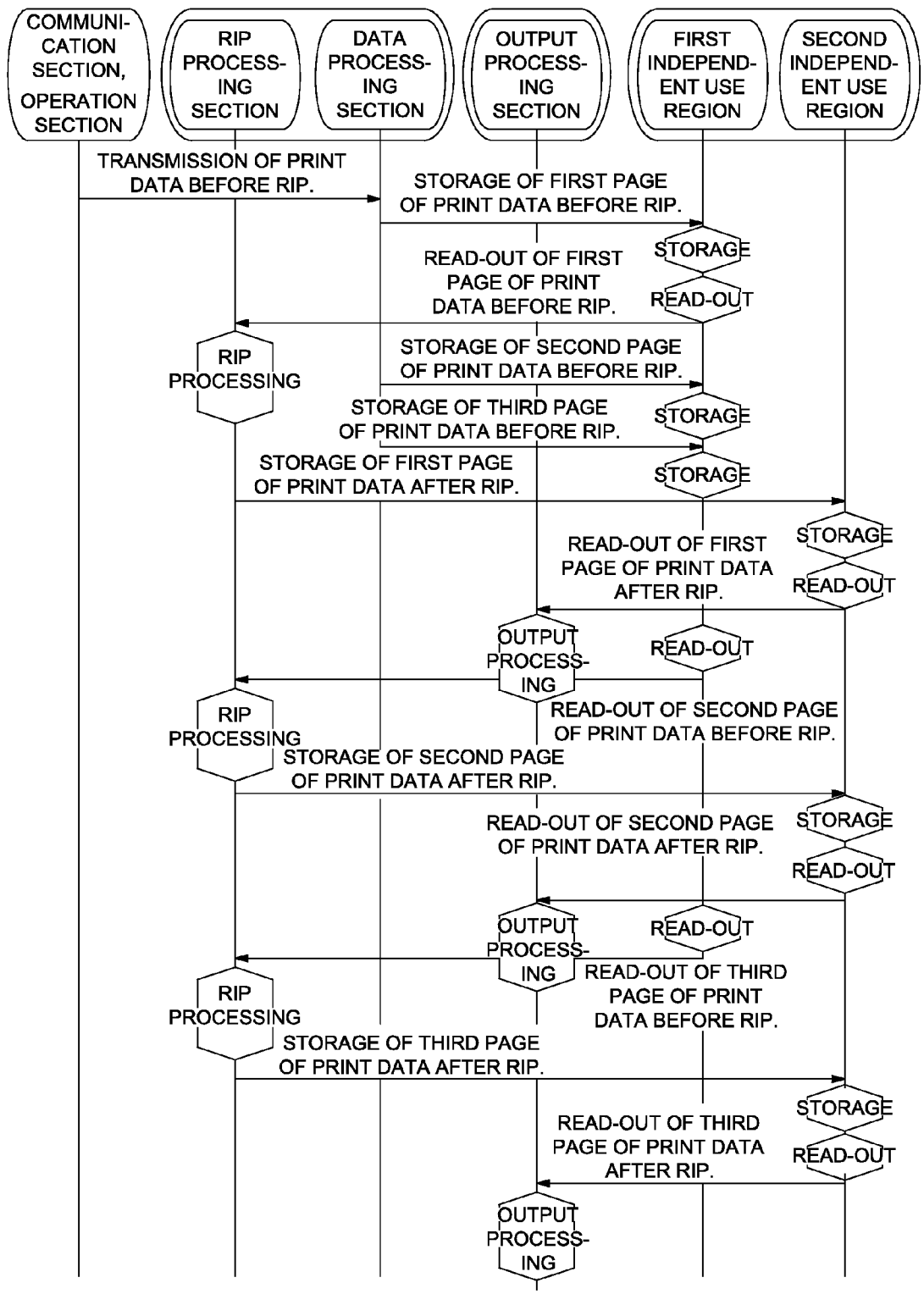
FIG. 4 is a time chart illustrating an operation of an image forming apparatus.

With reference to the time chart illustrated in FIG. 4, comparison operation (1) with respect to image formation by print data before RIP, having been transmitted from an external device, will be described below. It should be noted that the storage of each data into storage device 110' and the read-out from storage device 110' are controlled by control section 101.

First, print data before RIP is transmitted as print data from an external device via communication section 102.

Here, the first page of said print data before RIP is stored in first independent use region X1 in storage device 110', after having been subjected to necessary processing in data processing section 120.

Next, the first page of said print data before RIP is read-out from first independent use region X1 in storage device 110', and transmitted to RIP processing section 130, and then, converted into print data after RIP in a bit map format, after having been rasterized via RIP processing.

Then, the first page of the print data after RIP is stored in second independent use region X2 in storage device 110', and read-out at a prescribed timing and then, provided to image forming section 170, after having been subjected to processing which is necessary for image forming and output operations in output processing section 160.

Also, the second and third pages of the print data before RIP, having been transmitted from the external device, are stored in first independent use region X1 in storage device 110', after having been subjected to necessary processing in data processing section 120, at a timing in which the first page of the print data before RIP is being subjected to RIP processing, Next, the second page of the print data before RIP is read-out from first independent use region X1 at a timing in which the first page of the print data before RIP is being subjected to RIP processing in output processing section 160, and transmitted to RIP processing section 130, and then, converted into a print data after RIP in a bit map format, after having been rasterized via RIP processing. Then, the second page of the print data after RIP is temporarily stored in second independent use region X2 in storage device 110', and read-out at a prescribed timing, and then, provided to image forming section 170, after having been subjected to processing which is necessary for image forming and output operations in output processing section 160.

Further, the third page of the print data before RIP is read-out from first independent use region X1 at a timing in which the second page of the print data before RIP is being subjected to RIP processing in output processing section 160, and transmitted to RIP processing section 130, and then, converted into print data after RIP in a bit map format, after having been rasterized via RIP processing. Then, the third page of the print data after RIP is temporarily stored in second independent use region X2 in storage device 110', and read-out at a prescribed timing, and then, provided to image forming section 170, after having been subjected to processing which is necessary for image forming and output operations in output processing section 160.

In such a way, by carrying out various types of processings and storage and read-out in storage device 110', image formation with respect to the first to the third pages of the print data before RIP, having been transmitted from the external device, can be executed.

Figure 5:
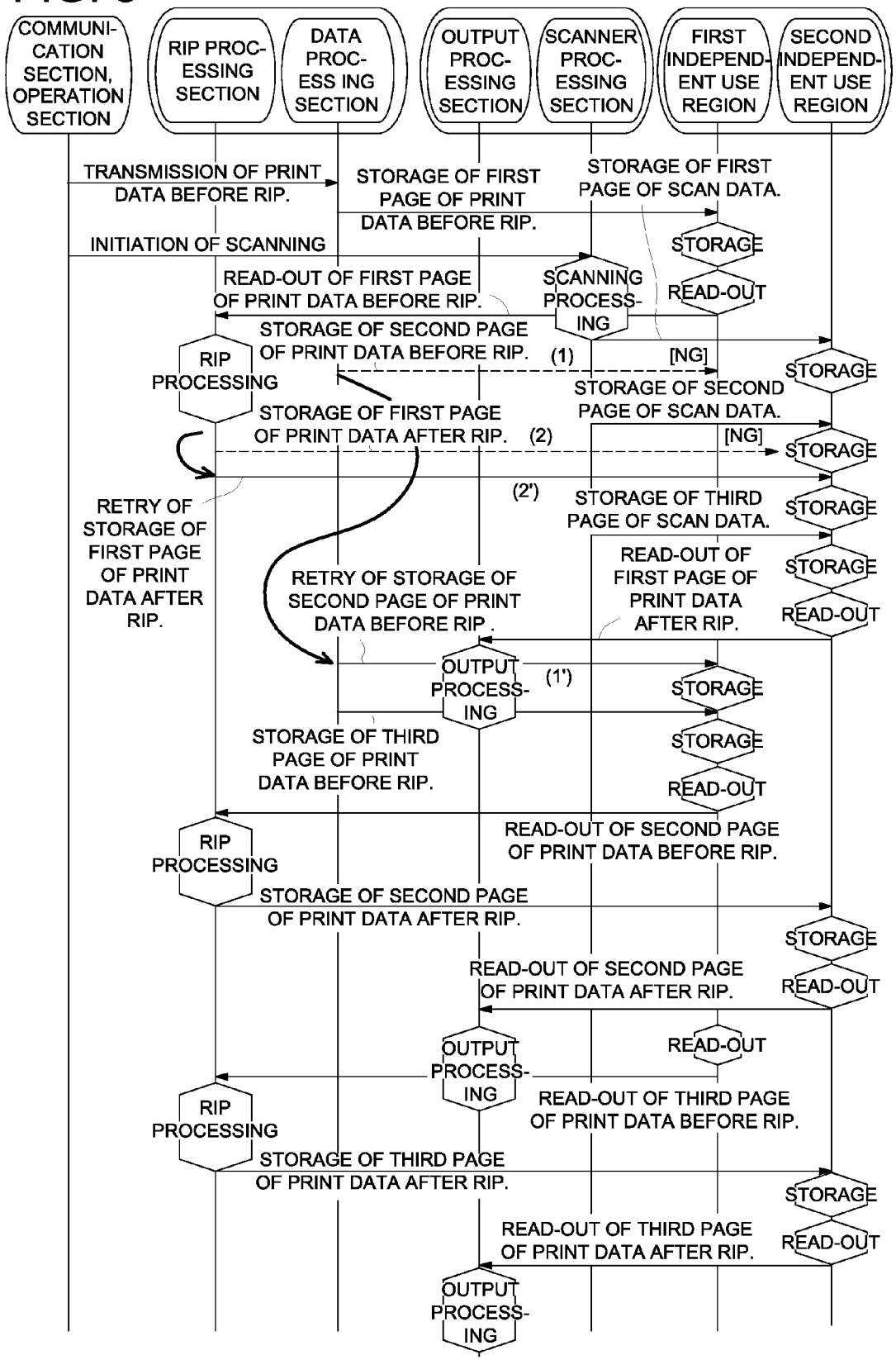
FIG. 5 is a time chart illustrating another operation of an image forming apparatus.

With reference to the time chart illustrated in FIG. 5, comparison operation (2) with respect to a case, in which image formation by print data before RIP, having been transmitted from an external device, and scanning via scanner section 105 are carried out in parallel, will be described below. Here, an example is described, in which priority is placed on scanning in a case in which scanning and other processing overlap.

First, print data before RIP is transmitted as print data from an external device via communication section 102.

Here, the first page of said print data before RIP is stored in first independent use region X1 in storage device 110', after having been subjected to necessary processing in data processing section 120.

Also, here, a command to perform scanning is input from operation section 103, after which scanner section 105 initiates scanning of original documents.

Next, the first page of said print data before RIP is read-out from first independent use region X1, and transmitted to RIP processing section 130, and then, converted into a print data after RIP in a bit map format, after having been rasterized via RIP processing.

Here, the result of read-out of the first page of the original documents in scanner section 105 is processed in scanner processing section 140 so as to be converted into scan data, and stored into second independent use region X2.

Following that, the result of read-out of the second page of the original documents in scanner section 105 is processed in scanner processing section 140 and converted into scan data, and stored into second independent use region X2.

At the timing (dashed line (2) in FIG. 5) in which the first page of print data after RIP has been temporarily stored in second independent use region X2 in storage device 110', the process for storing the second page of the scan data into second independent use region X2 is being carried out, and therefore, first independent use region X1 cannot be used. Thereby, the first page of print data after RIP is stored in second independent use region X2 in storage device 110' after awaiting for completion of storage of the second page of the scan data into second independent use region X2, as shown by solid line (2') in FIG. 5. After that, the first page of the print data after RIP is read-out at a prescribed timing, and provided to image forming section 170, after having been subjected to processing which is necessary for image forming and output operations in output processing section 160.

Also, with respect to the second page of the print data before RIP, having been transmitted from the external device, process for storing the first page of the scan data into second independent use region X2 is being carried out, and therefore, second independent use region X2 cannot be used at the same timing (dashed line (1) in FIG. 5) as the case of FIG. 4 in which the first page of the print data before RIP is being subjected to RIP processing. Thereby, the second page of the print data before RIP is stored in first independent use region X1 in storage device 110' after awaiting for completion of storage of the first page of the scan data into second independent use region X2 and other processings to which higher priority should be given, as shown by solid line (1') in FIG. 5.

It should be noted that the third page of the print data before RIP, having been transmitted from the external device, is processed in a delayed fashion similarly. Also, after that, processing proceeds in a similar fashion as illustrated in FIG. 4.

As described above, although it is possible to perform the processings sequentially without an occurrence of conflict of the timing of the access to storage device 110' in the case of a print only, as illustrated in FIG. 4, the timing of the access to storage device 110' conflicts with each other, as illustrated in FIG. 5, in the case in which printing and scanning exist in parallel, resulting in an occurrence of retrying and subsequent delay.

[Operation of an Image Forming Apparatus (Preferred Embodiment)]

Operation of an image forming apparatus according to this preferred embodiment will now be described. Here, a case, in which storage device 110 of which the structural example is illustrated in FIG. 2 is used, is described with reference to the flow chart illustrated in FIG. 6, explanatory block diagrams illustrated in FIGS. 7a and 7b, and the time chart illustrated in FIG. 8. Here, it is assumed that first independent use region X1 is to be the FS region, that second independent use region X2 is to be the RAW region, that first parallel use region Y1 is to be the FS region, and that second parallel use region Y2 is to be the RAW region.

First, with reference to the flow chart illustrated in FIG. 6, an operation with respect to control of use region of storage device 110, via control section 101, will be described.

Figure 6:
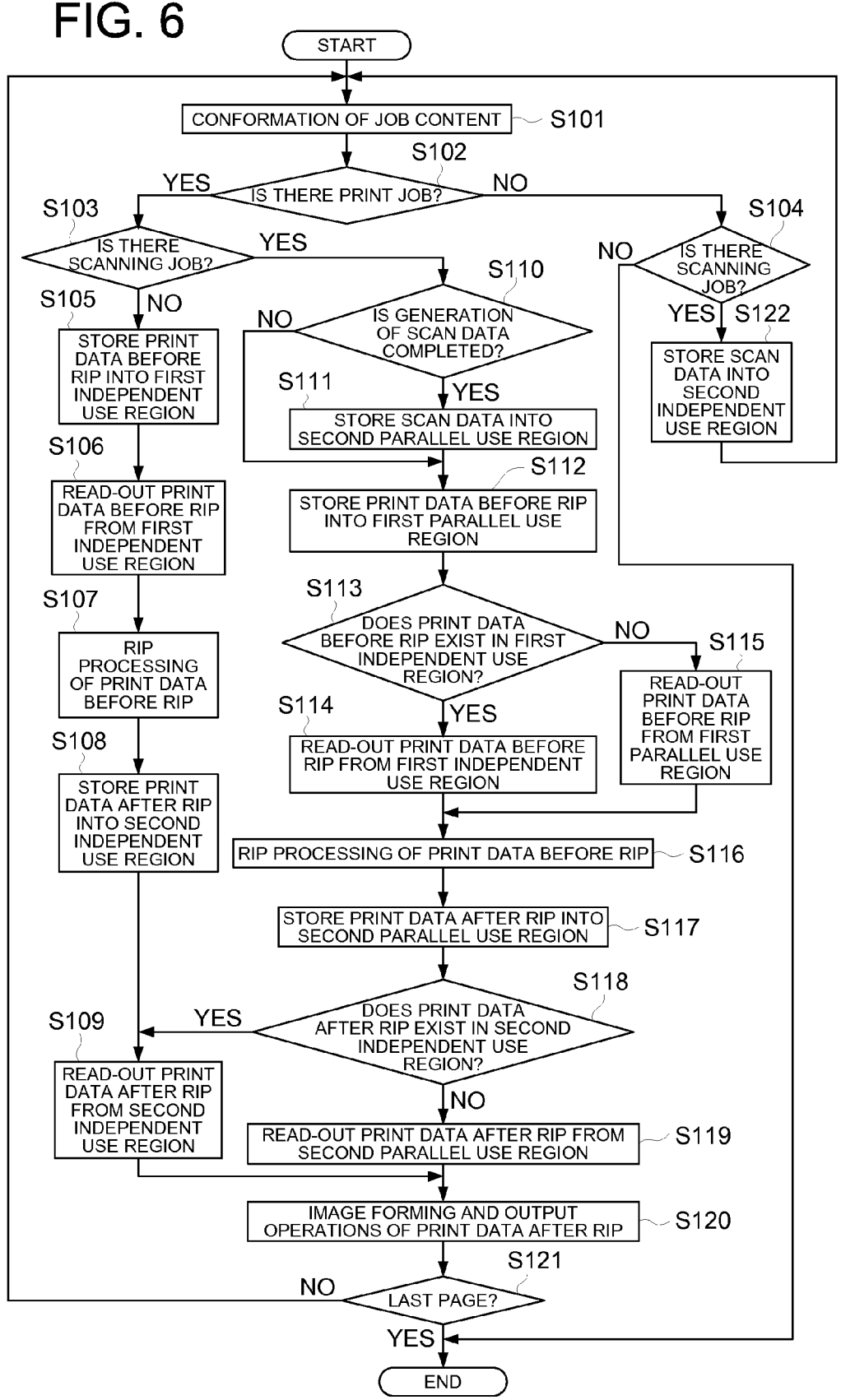
FIG. 6 is a flow chart illustrating an operation of an image forming apparatus according to a preferred embodiment of the present invention.

Control section 101 monitors communication with an external device via communication section 102, and operations of user input from operation section 103, and confirms the existence and content of a job under execution or a job to be executed (step S101 in FIG. 6).

Here, the presence or absence of a print job via transmission of print data before RIP from an external device is confirmed (step S102 in FIG. 6), and the presence or absence of a scanning job of an original document via scanner section 105 is confirmed (steps S103 and S104 in FIG. 6).

In a case in which a print job exists (step 102: YES in FIG. 6) and a scanning job does not exist (step S103: NO in FIG. 6), control section 1010 determines that it is the first mode in which only a print job exist, and stores the print data before RIP, having been transmitted from the external device via communication section 102, into first independent use region X1 in storage device 110 (step S105 in FIG. 6).

Here, the first mode is a mode in which all of a plurality of storage sections are used by striping to perform processing of independent job data because accesses to the storage device to perform processing of job data do not conflict with each other as independent job data is processed. In the case of this mode, control section 101 utilizes either first independent use region X1 or second independent use region X2 in storage device 110.

Control section 101 reads out that print data before RIP from first independent use region X1 (step S106 in FIG. 6), and transmits the print data to RIP processing section 130. This print data before RIP is converted into a print data after RIP in a bit map format, after having been rasterized by RIP processing via RIP processing section 130 (step S107 in FIG. 6).

Control section 101 stores this print data after RIP into second independent use region X2, which is a RAW region where data can be processed at high speed, in storage device 110 (step S108 in FIG. 6), then, reads out the print data after RIP from second independent use region X2 to perform processing which is necessary for image forming and output operations in output processing section 160, and then, provides said print data after RIP to image forming section 170 in accordance with the timing of image formation (step S109 in FIG. 6).

In this way, control section 101 executes image formation with respect to the print data after RIP (step S120 in FIG. 6), and executes image formation until the last page with respect to the print job (step S121 in FIG. 6).

Figure 7A:
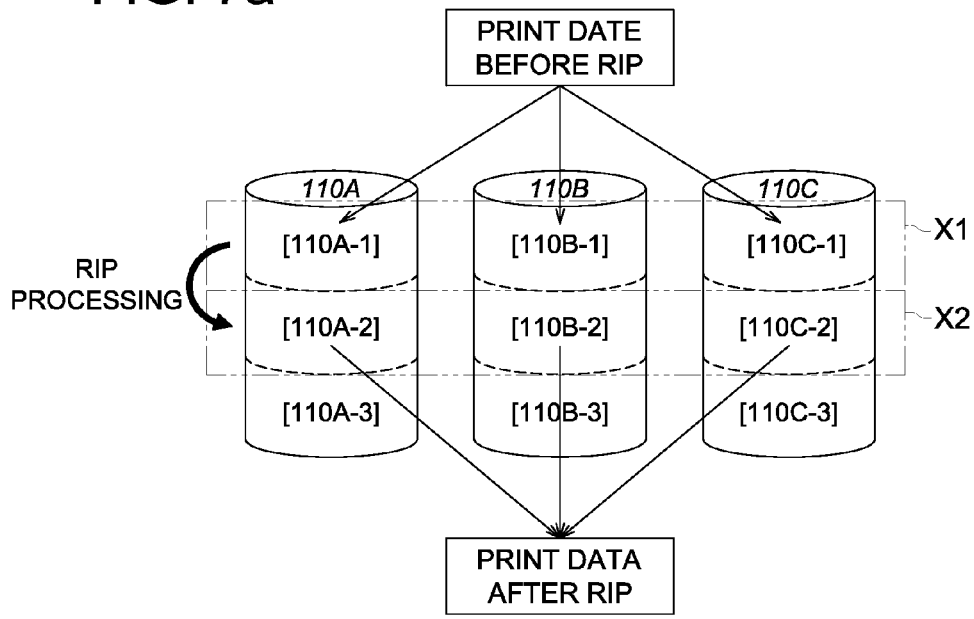
FIGS. 7a and 7b are each a block diagram illustrating a structure of a storage device according to a preferred embodiment of the present invention.

It should be noted that, in the case of the first mode in which only a print job exist, having been described, because plural access timings to storage device 110 do not conflict with each other, first independent use region X1 and second independent use region X2 are used alternately as illustrated in FIG. 7a. In this case, because all three of the storage sections are used by striping, speed up of operations without waste can be achieved.

Through the confirmation of job (step S101 in FIG. 6), in the case in which no print job exists (step S102: NO in FIG. 6) and a scanning job exists (step S104: YES in FIG. 6), control section 101 determines that it is the first mode in which only a scanning job exists, and stores scan data, which is generated in scanner processing section 140 when a document has been read-out via scanner section 105, into second independent use region X2 in storage device 110 (step S122 in FIG. 6). It should be noted that, because said scan data is generated as data in a bit map format in scanner processing section 140, control section 101 stores the scan data in RAW region, where high speed processing is possible, in storage device 110 in preparation for image formation. Again in this case, in a fashion similar to the case of FIG. 7a, because all three of the storage sections are used by striping, speed up of operations without waste can be achieved.

Through the confirmation of job (step S101 in FIG. 6), in a case in which a print job exists (step S102: YES in FIG. 6) and a scanning job exists (step S103: YES in FIG. 6), control section 101 determines that it is the second mode in which a print job and a scanning job exist in parallel, and proceeds processing efficiently as described below.

Here, the second mode is a mode in which a different storage section in a plurality of storage sections is used for each of a plurality of job data because accesses to the storage device to perform processing of job data conflict with each other since a plurality of job data is processed in parallel. In such a case, control section 101 utilizes either first parallel use region Y1 or second parallel use region Y2 in storage device 110.

First, control section 101 determines whether or not generation of one page of scan data, to be generated in scanner processing section 140, has been completed (step S110 in FIG. 6). In a case in which generation of scan data has not been completed (step S110: NO in FIG. 6), control section 101 proceeds to the next procedure.

In a case in which the generation of scan data has been completed (step S110: YES in FIG. 6), control section 101 stores the scan data into second parallel use region Y2 in storage device 110 (step S111 in FIG. 6). It should be noted that because said scan data is generated as data in a bit map format in scanner processing section 140, control section 101 stores the scan data in second parallel use region Y2 which is a RAW region, where high speed processing is possible, in storage device 110 in preparation for image formation.

Also, control section 101 stores print data before RIP, which has been transmitted from an external device via communication section 102, into first parallel use region Y1 in storage device 110 (step S112 in FIG. 6).

It should be noted that control section 101 confirms whether or not print data before RIP exists in first independent use region X1 (step S113 in FIG. 6) because there is a possibility that print data before RIP, in a state when operated in the first mode in which no scanning job exists and only a print job exist (step S105 in FIG. 6), remains in first independent use region X1.

In a case in which print data before RIP exists in first independent use region X1 (step S113: YES in FIG. 6), control section 101 reads out said print data before RIP from first independent use region X1 (step S114 in FIG. 6), and transmits it to RIP processing section 130.

In a case in which no print data before RIP exists in first independent use region X1 (step S113: NO in FIG. 6), control section 101 reads out print data before RIP from first parallel use region Y1 (step S115 in FIG. 6), and transmits it to RIP processing section 130.

Print data before RIP, which has been read-out in this way, is converted into print data after RIP in a bit map format, after having been rasterized by RIP processing via RIP processing section 130 (step S116 in FIG. 6).

Control section 101 stores said print data after RIP into second parallel use region Y2, which is a RAW region, where high speed processing is possible, and which can be used in parallel, in storage device 110, in preparation for image formation (step S117 in FIG. 6).

It is to be noted that control section 101 confirms whether or not print data after RIP exists in second independent use region X2 (step S118 in FIG. 6) because there is a possibility that print data after RIP, in a state in which no scanning job exists and only a print job is operated in the first mode (step S108 in FIG. 6), remains in second independent use region X2.

In a case in which print data after RIP exists in second independent use region X2 (step S118: YES in FIG. 6), control section 101 reads out said print data after RIP from second independent use region X2 to perform processing which is necessary for image forming and output operations in output processing section 160, and then, provides said print data after RIP to image forming section 170 in accordance with the timing of image formation (step S109 in FIG. 6).

In a case in which print data after RIP exists in second parallel use region Y2 (step S118: NO in FIG. 6), control section 101 reads out said print data after RIP from second parallel use region Y2 to perform processing which is necessary for image forming and output operations in output processing section 160, and then, provides said print data after RIP to image forming section 170 in accordance with the timing of image formation (step S119 in FIG. 6).

In this way, control section 101 executes image formation with respect to the print data after RIP (step S120 in FIG. 6), and executes image formation until the last page with respect to the print job (step S121 in FIG. 6), and also executes processing of storage with respect to scan data (step S111 in FIG. 6).

Figure 7B:
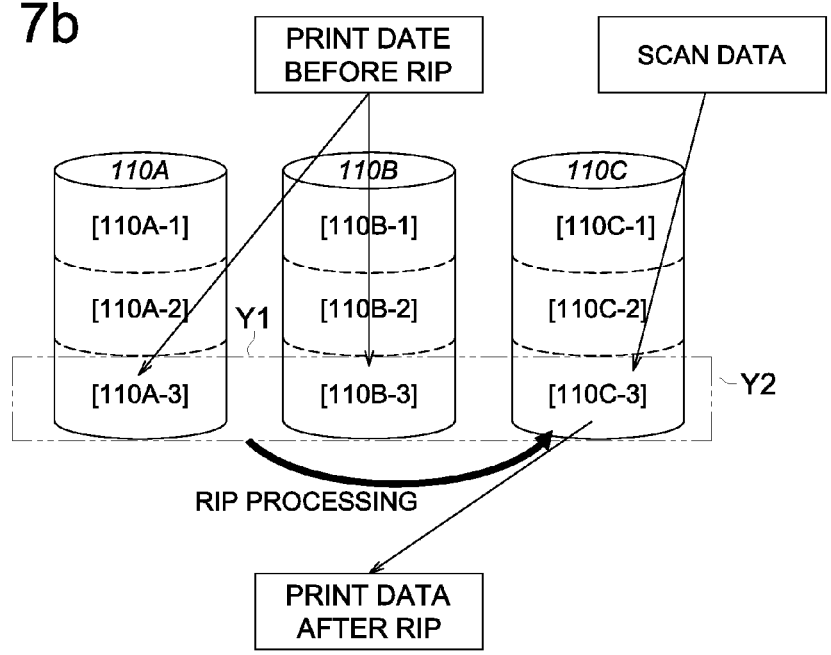

It is to be noted that, in the case of the second mode described above, the operations proceed without any problems even in a case, in which a plurality of access timings to storage device 110 overlap, because first parallel use region Y1 and second parallel use region Y2, which are structured so as to enable parallel use, are used by dividing plural storage sections 110A-110C into storage sections 110A-110B and storage section 110C, as illustrated in FIG. 7b.

Here, with reference to the time chart illustrated in FIG. 8, a concrete example of the case, in which the flow chart illustrated in FIG. 6 is concretely executed, will be described in the order of execution timing in the operations according to this preferred embodiment with respect to the case, in which image formation by print data before RIP, having been transmitted from an external device, and scanning in scanner section 105 are carried out in parallel as is the case in FIG. 5.

First, print data before RIP as print data is transmitted from an external device via communication section 102. The first page of said print data before RIP is stored into first independent use region X1 in storage device 110, after having been subjected to necessary processing in data processing section 120. At this time, because there is only a print job, control section 101 carries out control as the first mode, which applies to the processing described in step S105 in FIG. 6.

Here, a command to perform scanning is input from operation section 103, and scanner section 105 initiates scanning of original documents. In this way, control section determines that the rest of the processing is the same as in the second mode in which scanning processing and print processing are carried out in parallel, and executes processing after step S110 in FIG. 6.

Next, the first page of the print data before RIP, having been stored, is read-out from first independent use region X1. This portion applies to the processing described in step S114 in FIG. 6, in which the data, having been stored at the timing of print processing only, is read-out even after parallel processing of scanning processing and print processing have been initiated.

Then, the result of the read-out of the first page of the original documents in scanner section 105 is processed in scanner processing section 140, and is converted into scan data, and then is stored into second parallel use region Y2, as the second mode. Also, in parallel with the storage of said scan data into second parallel use region Y2, the second page of the print data before RIP, having been transmitted from the external device, is stored into first parallel use region Y1, as the second mode.

Then, the first page of the print data after RIP in a bit map format, for which the RIP processing has been performed, is stored into second parallel use region Y2, as the second mode. Also, in parallel to the storage of the first page of said print data before RIP into second parallel use region Y2, the second page of the print data before RIP is read-out from first parallel use region Y1, as the second mode.

After that, the first page of the print data after RIP is read-out at a prescribed timing, and is provided to image forming section 170, after having been subjected to processing which is necessary for image forming and output operations in output processing section 160.

Also, the third page of the print data before RIP, having been transmitted from the external device, is stored into first parallel use region Y1, as the second mode.

Then, the second page of the print data after RIP in a bit map format, for which the RIP processing has been performed, is stored into second parallel use region Y2, as the second mode. Also, in parallel with the storage of the second page of said print data before RIP into second parallel use region Y2, the third page of the print data before RIP is read-out from first parallel use region Y1, as the second mode.

Then, the result of the read-out of the second page of the original documents in scanner section 105 is processed in scanner processing section 140, and is converted into scan data, and then is stored into second parallel use region Y2, as the second mode.

After that, the second page of the print data after RIP is read-out at a prescribed timing, and provided to image forming section 170, after having been subjected to processing which is necessary for image forming and output operations in output processing section 160.

Then, the third page of the print data after RIP in a bit map format, for which the RIP processing has been performed, is stored into second parallel use region Y2. After that, the third page of the print data after RIP is read-out at a prescribed timing, and provided to image forming section 170, after having been subjected to processing which is necessary for image forming and output operations in output processing section 160.

Thus, the processing with respect to print data has been completed, and control section 101 executes the rest of processing on the premise that it is the first mode. In other words, the result of read-out of the third page of the original documents in scanner section 105 is processed in scanner processing section 140, and is converted into scan data, and then is stored into second independent use region X2, as the first mode. This portion is scanning processing only, and applies to the processing described in step S122 in FIG. 6.

Figure 8:
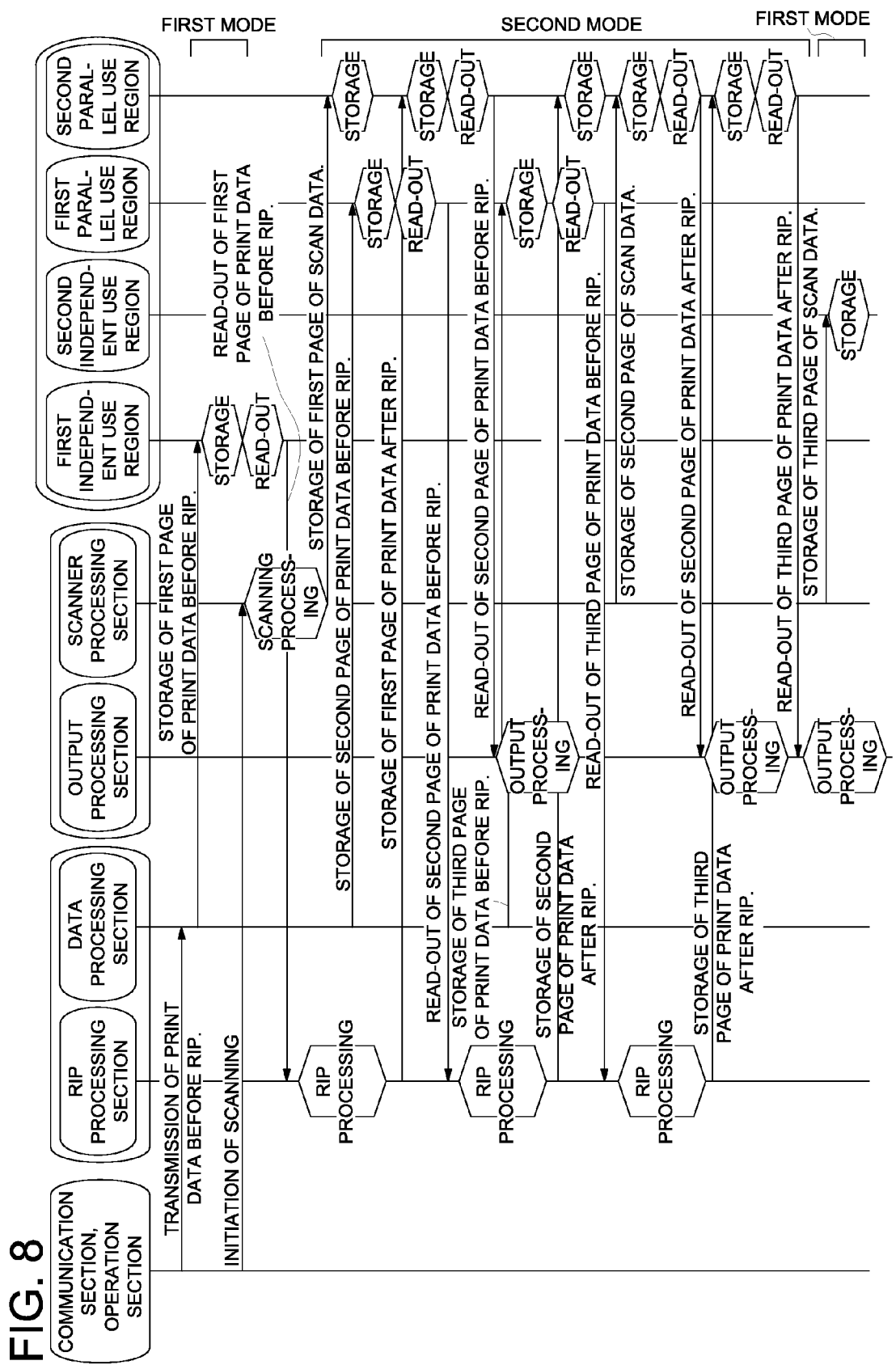
FIG. 8 is a time chart illustrating an operation of an image forming apparatus according to a preferred embodiment of the present invention.

It should be noted that the above-mentioned FIG. 8 is nothing more than a concrete example of the processing of the first mode and the second mode, and various types of processings can be performed efficiently in accordance with the processing of the flow chart illustrated in FIG. 6.

In such a way, when job data of either one of independent print data or scan data is processed, control section 101 uses either first independent use region X1 or second independent use region X2 in storage device 110 in the mode in which accesses to the storage device, via the processing of job data, do not conflict with each other, and all of the plurality of storage sections are used by striping to perform processing of independent job data. In other words, because all of the storage sections are used by striping in the first mode, speed up of operations without waste can be achieved.

Also, when a plurality of job data is processed in parallel, control section 101 uses either first parallel use region Y1 or second parallel use region Y2 in storage device 110 in the mode in which accesses to the storage device, via the processing of job data, conflict with each other, and a different storage section in the plurality of storage sections is used for each of the plurality of job data. In other words, in the second mode, because first parallel use region Y1 and second parallel use region Y2, which are structured so as to enable parallel use, are used by dividing plural storage sections 110A-110C into storage sections 110A-110B and storage section 110C, the operations proceed without any problems even in a case in which a plurality of access timings to storage device 110 overlaps. Therefore, efficient processing can be performed without retrying and subsequent delay in processing.

[Other Preferred Embodiments]

It should be noted that, in a case in which three kinds of job data, such as print data, scan data, and facsimile reception data, exist in storage device 110 according to the preferred embodiment, the independent use region may be divided into three regions of X1-X3, and the parallel use region may be divided into three regions of Y1-Y3, and in such a manner, the number of regions may be determined in accordance with the kind of job data.

Further, in the above description, the cases, in which the timings to use the storage device by print data and scan data conflict with each other, has been described as a concrete example. However, the present invention is not restricted thereto. For example, it is also possible to apply to a case, in which the timings to use the storage device conflict with each other, by performing a plurality of different image processings with respect to a plurality of print data.

Although the preferred embodiment of the present invention have been fully described by way of examples with reference to the accompanying drawings, it is to be noted that various changes and modifications will be apparent to those skilled in the art. Therefore, unless such changes and modifications depart from the scope of the present invention, they are to be construed as being included therein.

What is claimed is:

1. An image forming apparatus comprising:
a plurality of storage devices each comprising a plurality of storage sections for storing a job data to be input;
an image forming section for performing an image formation operation based on the job data stored in the plurality of storage devices; and
a control section configured to control a first mode in which all of the plurality of storage devices are used by striping with respect to an independent job data, and a second mode in which different storage devices from among the plurality of storage devices are used for each of a plurality of job data;
wherein each of the plurality of storage devices comprises at least a storage section for the first mode and a storage section for the second mode; and
wherein the control section is configured to
(i) use the first mode in which all of the plurality of storage sections are used by striping with respect to the independent job data, in a case in which accesses to the storage devices, via processing of the job data, do not conflict with each other, and
(ii) use the second mode in which different storage devices from among the plurality of storage devices are used for each of the plurality of job data, in a case in which accesses to the storage devices, via processing of the job data, conflict with each other.

2. A job data storing method of an image forming apparatus, the image forming apparatus comprising
(i) a plurality of storage devices each comprising a plurality of storage sections for storing a job data to be input,
(ii) an image forming section for performing an image formation operation based on the job data stored in the plurality of storage sections, and
(iii) a control section configured to control a first mode in which all of the plurality of storage devices are used by striping with respect to an independent job data and a second mode in which different storage devices from among the plurality of storage devices are used for each of a plurality of job data, wherein each of the plurality of storage devices comprises at least a storage section for the first mode and a storage section for the second mode, and wherein the job data storing method comprises:
controlling to use the first mode in which all of the plurality of storage sections are used by striping with respect to the independent job data, in a case in which accesses to the storage devices, via processing of the job data, do not conflict with each other; and
controlling to use the second mode, in which different storage devices from among the plurality of storage devices are used for each of the plurality of job data, in a case in which accesses to the storage devices, via processing of the job data, conflict with each other.

* * * * *